No. 783,771. PATENTED FEB. 28, 1905.
C. H. ANDERSON.
CONVEYER.
APPLICATION FILED JAN. 21, 1904.
8 SHEETS—SHEET 1.
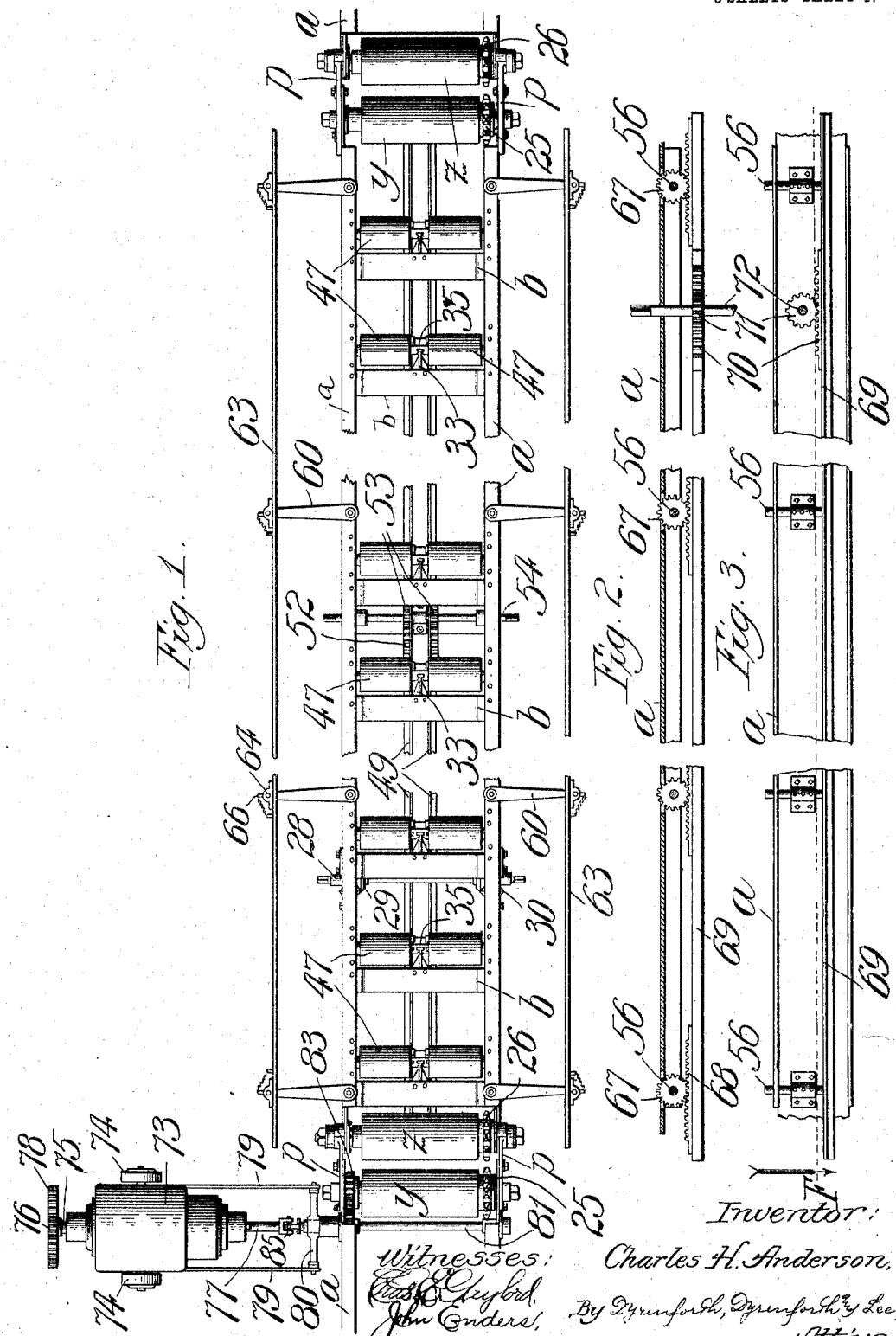
Inventor:
Charles H. Anderson,
By Dyrenforth, Dyrenforth & Lee,
Att'ys No. 783,771. PATENTED FEB. 28, 1905.
C. H. ANDERSON.
CONVEYER.
APPLICATION FILED JAN. 21, 1904.
8 SHEETS—SHEET 2.
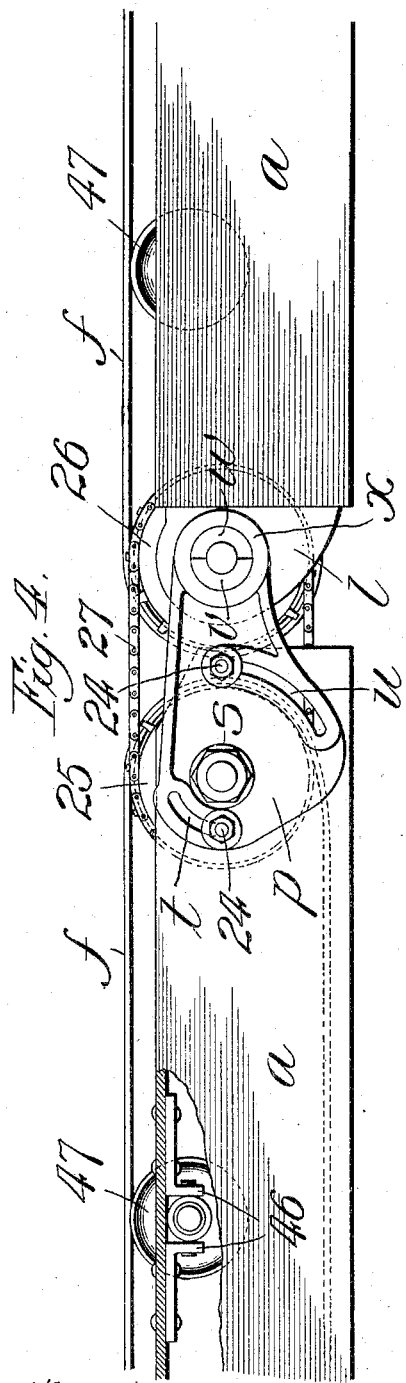
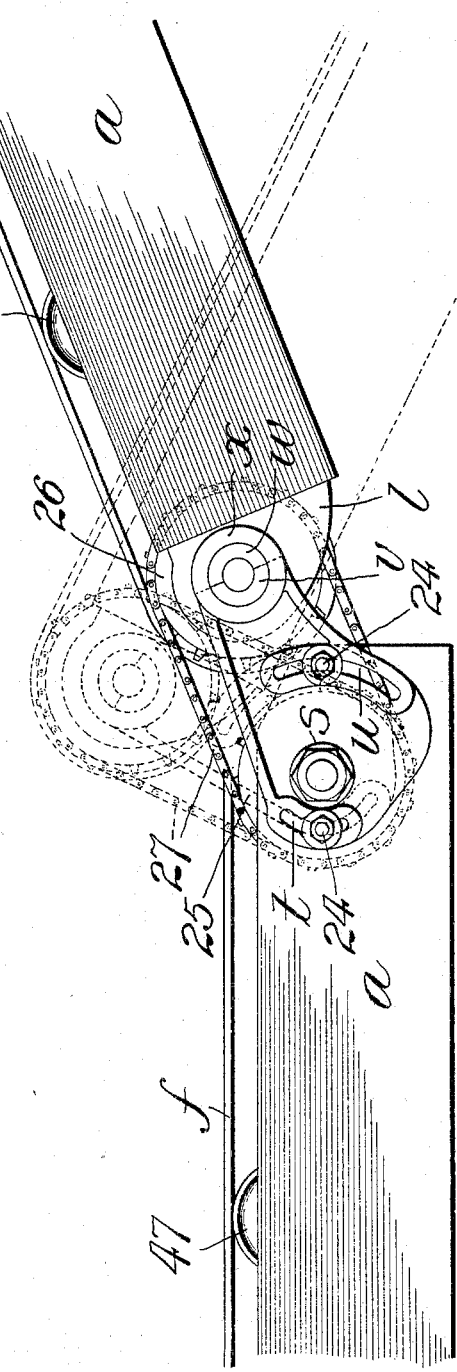
Witnesses:
Chas E Gaylord.
John Enders.
Inventor:
Charles H. Anderson,
By Dyrenforth Dyrenforth & Lee,
Att'ys

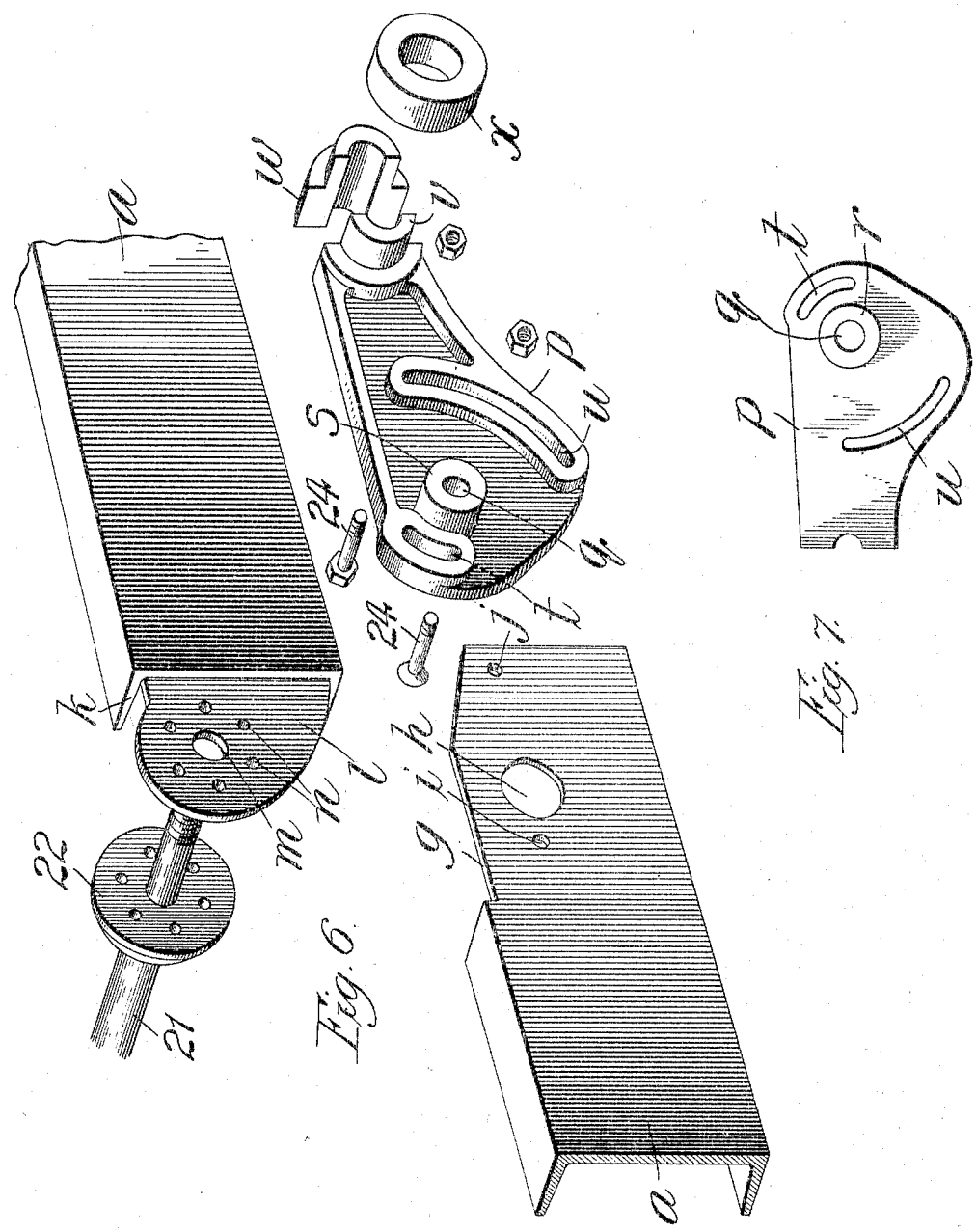

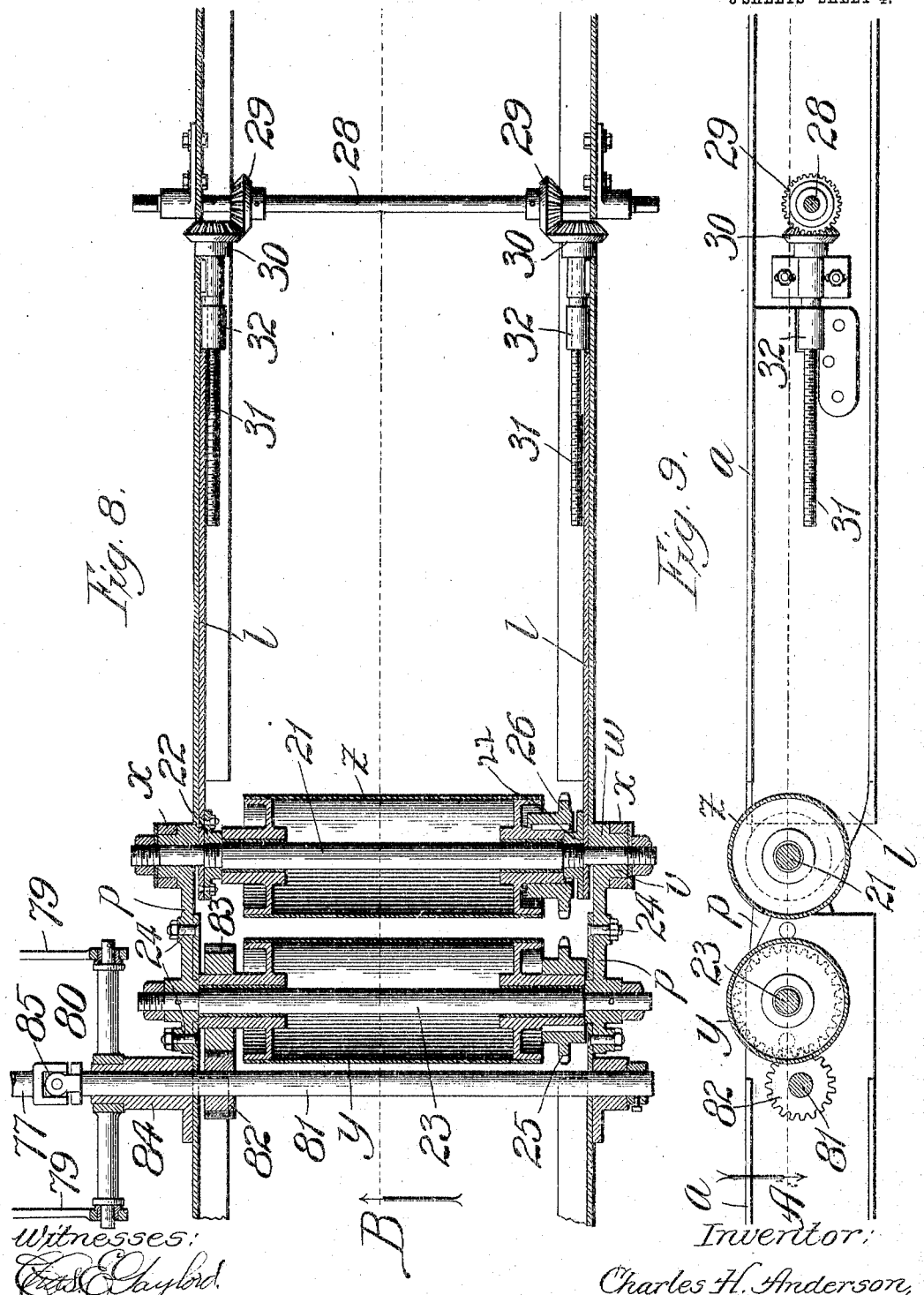

No. 783,771. PATENTED FEB. 28, 1905.
C. H. ANDERSON.
CONVEYER.
APPLICATION FILED JAN. 21, 1904.
8 SHEETS—SHEET 5.
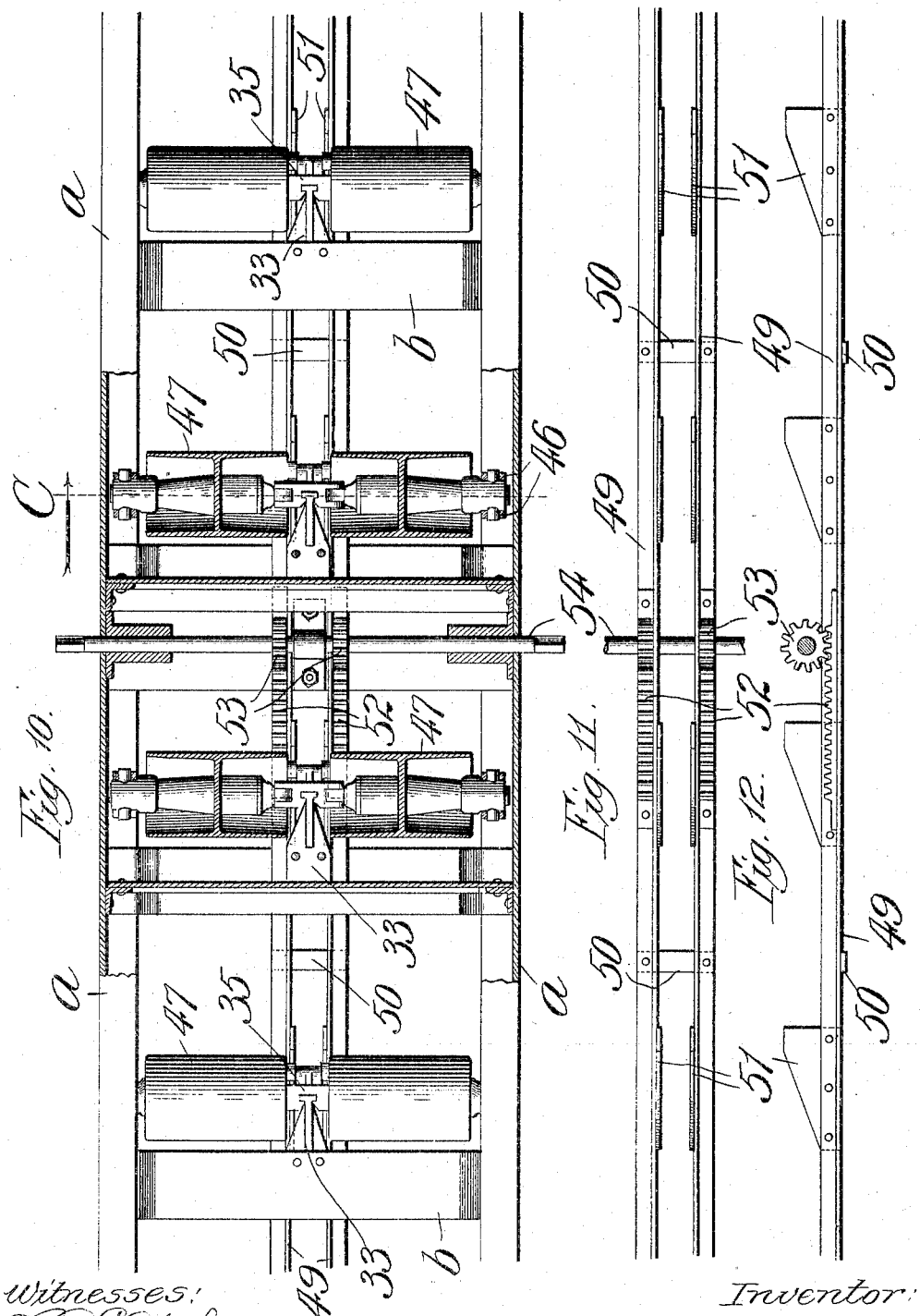
Witnesses:
Chas. E. Gaybrd.
John Enders.
Inventor:
Charles H. Anderson,
By Dyrenforth, Dyrenforth & Lee,
Att'ys.

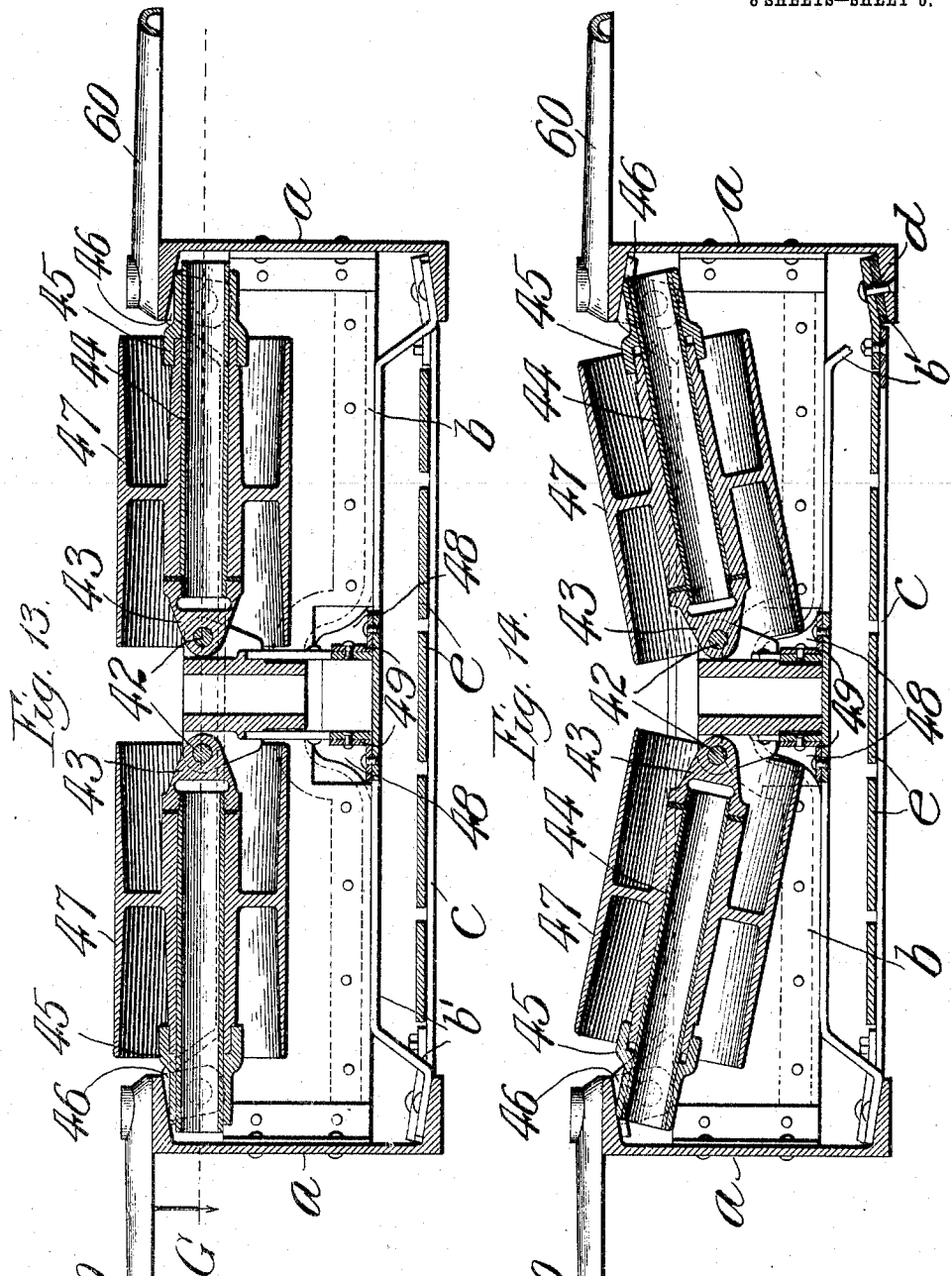

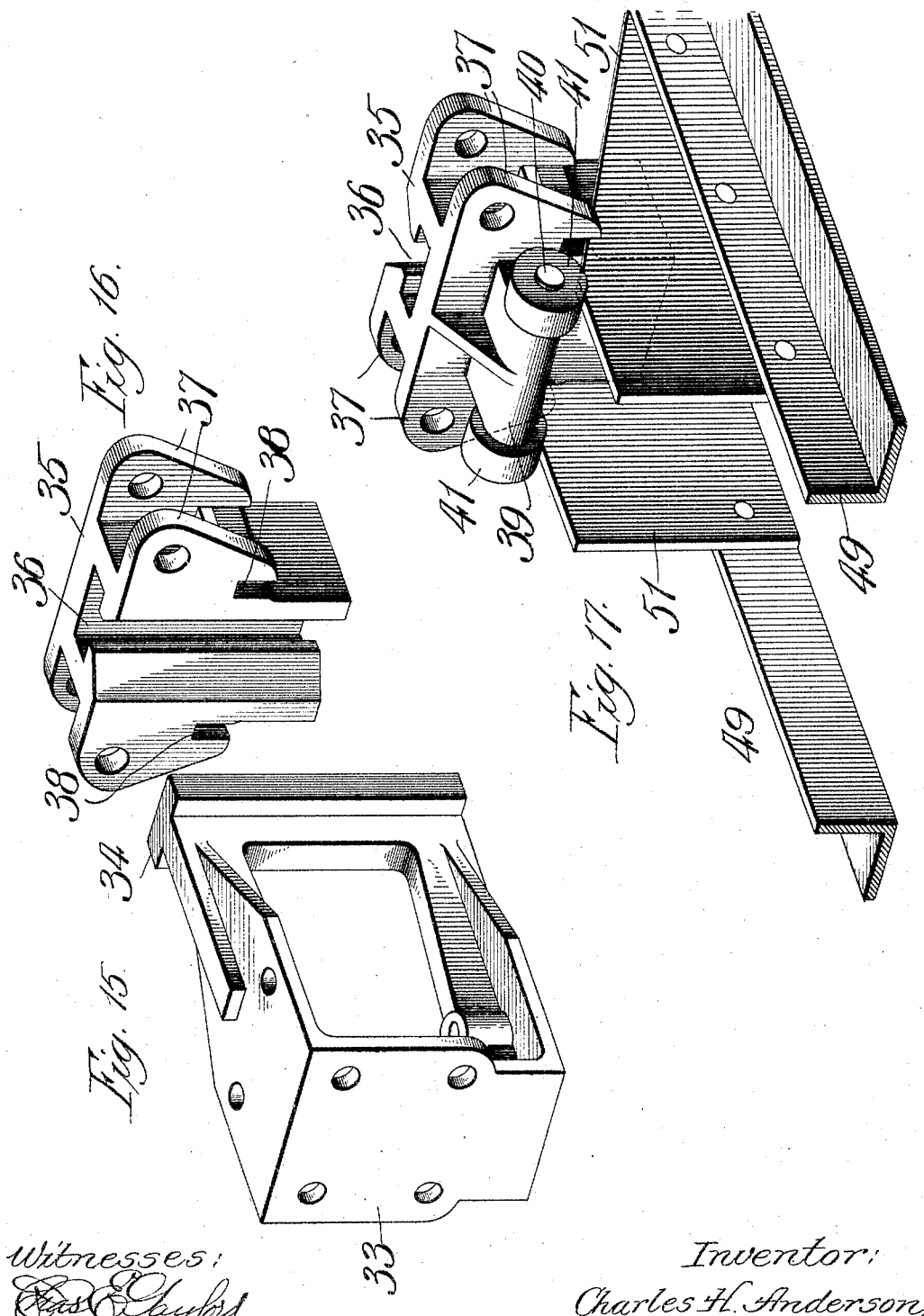

No. 783,771. PATENTED FEB. 28, 1905.
C. H. ANDERSON.
CONVEYER.
APPLICATION FILED JAN. 21, 1904.
8 SHEETS—SHEET 3.
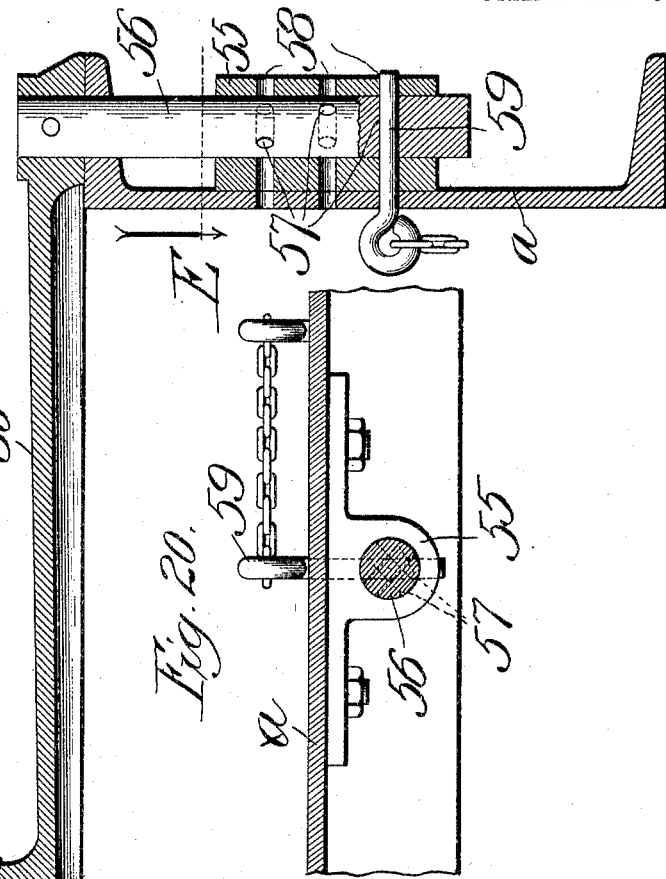
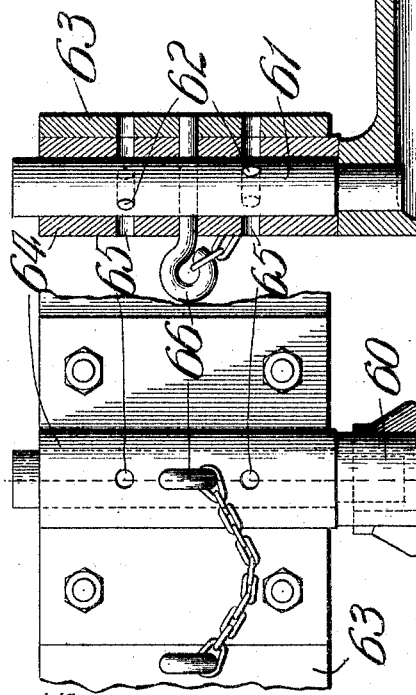
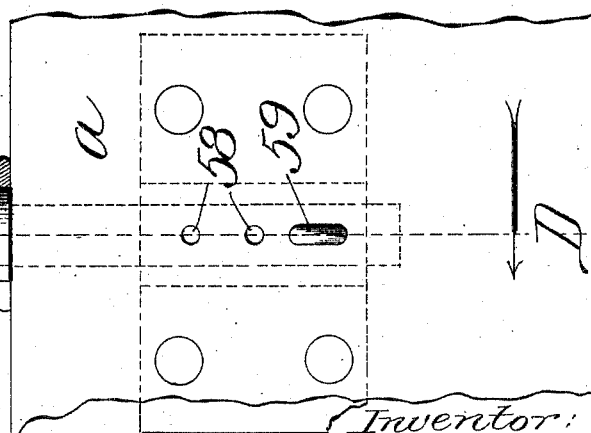
Witnesses:
Chas. E. Gaylord
John Enders
Inventor:
Charles H. Anderson,
By Dyrenforth, Dyrenforth & Lee,
Att'ys No. 783,771.      Patented February 28, 1905.

UNITED STATES PATENT OFFICE.

CHARLES H. ANDERSON, OF CHICAGO, ILLINOIS.

CONVEYER.

SPECIFICATION forming part of Letters Patent No. 783,771, dated February 28, 1905.

Application filed January 21, 1904. Serial No. 189,991.

*To all whom it may concern:*

Be it known that I, CHARLES H. ANDERSON, a citizen of the United States, residing at Chicago, in the county of Cook and State of Illinois, have invented a new and useful Improvement in Conveyers, of which the following is a specification.

This invention relates to improvements in portable conveyers for use more especially in transferring merchandise on wharves or in warehouses or for moving cargoes during the operation of loading or unloading the same.

My object is to provide a conveyer adapted for the above purpose and of a generally-improved construction, whereby it may be readily transported to different locations or shifted about as required by changes in receiving-points or points of delivery and which will cause its conveyer-belt to extend in a plane close to the floor on which the conveyer rests.

It is also my object to provide the conveyer in sections which may be readily attached to and detached from each other and caused to extend at different angles with relation to each other as the points of loading and delivery and the intervening stretch may require.

It is, further, my object to adapt the sections for carrying various kinds of merchandise, whether in bulk, barrels, boxes, bales, or the like, in the most desirable and convenient manner, and, furthermore, to provide improved means for running the movable conveyer-belts on the sections.

Referring to the drawings, Figure 1 is a broken plan view showing an intermediate conveyer-section joined at opposite ends to other sections, one of which is connected to an electric conveyer-belt-driving motor; Figs. 2 and 3, broken plan sectional and elevational views, respectively, Fig. 2 being taken on line F in Fig. 3, of a modified form of mechanism for operating adjustable guide-rails which prevent packages while moving upon the conveyer from falling off; Fig. 4, an enlarged partly-broken side elevation of adjacent conveyer-sections, illustrating my improved means for connecting them together; Fig. 5, a similar view of the same, illustrating the manner of adjusting the sections to different angles with relation to each other; Fig. 6, a perspective view of details of the connecting means for the sections, some of the parts being broken away; Fig. 7, an elevation of the reverse side, on a smaller scale, of one of the connecting-links for the sections; Fig. 8, a broken and enlarged plan section through the end portions of adjacent conveyer-sections, illustrating the driving-motor connections, the connections between the sections and belt-tightening mechanism, the view being taken on line A in Fig. 9; Fig. 9, a section taken on line B in Fig. 8 viewed in the direction of the arrow; Fig. 10, a broken sectional plan view of one of the conveyer-sections, illustrating the construction and manner of mounting the adjustable carrier-rollers, the section being taken on line G in Fig. 13; Fig. 11, a broken detailed plan view illustrating means for raising and lowering the inner ends of the carrier-rollers; Fig. 12, a partly-sectional side elevation of the same mechanism; Fig. 13, an enlarged section taken on line C in Fig. 10 and showing the carrier-rollers in raised position; Fig. 14, a similar view showing the carrier-rollers depressed; Fig. 15, an enlarged perspective view of a relatively stationary guide-block, of which there is one for each pair of adjustable rollers; Fig. 16, a similar view of a raising and lowering block forming the support for the inner ends of companion carrier-rollers and adjustable upon the block shown in Fig. 15; Fig. 17, a broken perspective view showing the reverse side of the block illustrated in Fig. 16 and the means for raising and lowering the same; Fig. 18, an enlarged broken side elevation of a part of one of the conveyer-sections, showing the preferred means for adjusting the guide-rails; Fig. 19, a section taken on line D in Fig. 18, and Fig. 20 a broken plan section taken on line E in Fig. 19.

The frame of each conveyer-section consists of longitudinally-extending channel-beams *a*, forming the sides and joined together at intervals by cross-braces *b*. At the under side of each section are cross-extending plates or bars *c*, removably fastened at their ends to lugs or clips *d*, as indicated at one side of Fig. 14. The parts $c$ support longitudinally-extending boards or strips $e$ for the under stretch of the canvas or other flexible conveyer-belt $f$ to slide upon. The channel-beams of each section are cut away at one end, as shown at $g$ in Fig. 6, and present each a bearing-opening $h$ and bolt-receiving perforations $i\ j$. The opposite ends of the channel-beams are squared, as shown at $k$, and in the said end portions of the channel-beams are mounted sliding belt-tensioning plates $l$, presenting bearing-openings $m$ and bolt-receiving perforations $n$. The sections are detachably connected together by means of links $p$, each formed, as shown in Figs. 6 and 7, with a shaft-receiving opening $q$, extending through short cylindrical bosses $r\ s$ on opposite sides, and segmental recesses $t\ u$ in the locations shown. On the ends of the links are laterally-extending segmental bosses $v$, presenting segmental bearing-openings, and fitting against the said ends are segmental filler-blocks $w$. The blocks $w$ are removably secured against the ends of the links by rings $x$, which fit upon the annular shoulder presented by the parts when fitted together. At opposite ends of each section are belt-driving pulleys $y\ z$, comprising drums having hubs provided with bushed bearing-openings. Extending through each pulley $z$ is a shaft 21, screw-fastened near opposite ends to spacers 22, bolted to the openings $n$ of the tensioning-plates $l$. Beyond the tensioning-plates the shaft 21 is pivotally connected to the free end portions of the links $p$, the parts being detachably joined by the rings or collars $x$. Nuts and washers on the ends of the shaft hold the parts in place. Each pulley $y$ is upon a shaft 23, fastened at opposite ends in the openings $q$ of the links $p$. The bosses $r$ of the links extend into the openings $h$ of the channel-beams, forming there a pivotal connection, and bolts 24 pass through the perforations $i\ j$ of the channel-beams and through the segmental openings $t\ u$ of the links, whereby the latter may be fastened in adjusted position. Keyed to the hubs of the pulleys $y\ z$ are sprocket-wheels 25 26, respectively, which in practice are belted together by a drive-chain 27. The object of the link connections between conveyer-sections is to permit them to be adjusted to different angles with relation to each other, as shown by full lines in Figs. 4 and 5 and by dotted lines in the latter figure.

28 is a belt-tightening shaft squared at opposite ends to receive a crank or the like. This shaft carries beveled gears 29, meshing with similar gears 30 on screws 31, working through threaded ears 32 on the belt-tightening plates $l$. By turning the shaft 28 the plates $l$ are moved longitudinally and simultaneously to move the pulley $z$ to tighten or slacken the belt $f$.

Fastened to the webs of the built-up I-beams or braces $b$ are guide-blocks 33, of the form shown most plainly in Fig. 15, presenting each a flanged guide 34 centrally between the channel-beams.

35 is a vertically-sliding block having a grooved face 36 to fit over the part 34 and having perforated bearing-ears 37 at opposite sides. At the under sides of the ears are recesses 38, and on the side of the block 35 (shown in Fig. 17) is a perforated boss 39, in which is a shaft 40, carrying antifriction-rollers 41. Pivotally mounted between the ears 37 on pins 42 are swinging links or socket-pieces 43, in which are fastened tubes or shafts 44, passing at their opposite end portions through trunnioned sleeves 45. The trunnions of the sleeves 45 are journaled in bearing-brackets 46, riveted to the channel-beams. Journaled upon the shafts 44 and confined between the parts 43 45 are carrier-rollers 47. The hubs of the rollers 47 at their outer ends are overlapped by the sleeves 45 to present dust-proof joints.

The web of each cross-brace $b$ is cut away at the center toward the lower side to present the opening 48. Extending through the openings 48 is a sliding frame consisting of a pair of parallel angle-bars 49, resting upon the lower flanges of the cross-braces $b$ and tied together at intervals by cross-pieces 50. Fastened to the angle-bars 49 are wedges 51, shaped, preferably, as shown in Fig. 12. A pair of wedges 51 bears against the under sides of the antifriction-rollers 41 of each vertically-sliding block 35, and they move in the recesses 38 of the said blocks. On the frame formed by the longitudinally-movable angle-bars 49 is a rack 52, meshing with a pinion 53 on a shaft 54, journaled in the channel-bars $a$. The outer ends of the shaft 54 are squared to receive a crank or the like. By turning the shaft 54 in one direction the frame 49 is moved longitudinally to cause the wedges 51 to slide beneath the rollers 41 and raise the blocks 35 and inner ends of the rollers 47 to the position shown in Fig. 13. Contrary turning of the shaft 54 permits the blocks 35 and inner ends of the rollers 47 to descend to the position shown in Fig. 14. Thus all the rollers 47 on a conveyer-section are adjusted simultaneously.

At intervals along the inner sides of the channel-beams are vertically-perforated blocks 55, in which are journaled pins 56, passing upward through openings in the channel-beam flanges. The pins 56 have transverse openings 57 at angles to each other, as indicated by dotted lines in Fig. 20. Extending through the channel-beams and blocks 55 are openings 58 to receive pins 59. Rigidly fastened to the upper ends of the pins 56 are crank-arms 60, provided at their outer ends with vertical openings to receive the lower ends of pins 61, having perforations 62 at angles to each other to correspond with the similar perforations 57 in the pins 56.

63 represents strips or guide-rails extending approximately the full length of the conveyer-section. On these guide-rails are boxes 64, having series of openings 65, which openings also extend through the rails. The rails are adjustable toward and away from the channel-beams and may be fastened in adjusted position by passing pins 66 through the openings 62 65 when in register and by passing the pins 59 through the openings 57 58 when in register. By withdrawing the pins 66 59 the rails 63 may be swung laterally and fastened again in adjusted position to prevent packages while being conveyed by the belt $f$ from falling off.

In Figs. 2 and 3 is shown a modified form of adjusting mechanism for the guide-rails 63. In this construction each pin 56 is provided at its lower end with a pinion 67, meshing with a rack 68 on a rack-bar 69. A longitudinally-sliding rack-bar 69 is provided at each channel-beam and carries a rack 70, meshing with a pinion 71 on a cross-shaft 72, passing through the channel-beams and squared at its outer ends to receive a crank. By turning the shaft 72 both guide-rails on a section may be adjusted simultaneously.

73 is an electric motor mounted upon a truck having wheels 74, whereby it may readily be moved from place to place. The motor has an armature-shaft 75, provided with a pinion 76, and also a shaft 77 at its under side, carrying a gear-wheel 78, meshing with the pinion 76. Extending from the truck or wheeled frame on which the motor is mounted are parallel arms 79, pivotally secured at their free ends to a yoke 80. On one of the conveyer-sections shown is a cross-shaft 81, carrying a pinion 82, meshing with a gear-wheel 83 on the shaft 23 of the adjacent pulley $y$. The shaft 81 extends through a box 84 on the adjacent channel-beam, the said box having a reduced outer end portion forming a bearing for the hub of the yoke 80. The shafts 77 81 are removably connected together by means of a universal joint 85. This universal joint is of common construction, and one of the connecting-pins—for example, the pins shown by plan view in Fig. 8—may be readily removed to permit separation of the members of the joint.

In practice as many conveyer-sections may be employed as desired. One or a few only of the sections employed need be provided with the drive-shafts 81 for connection with a motor 73. The sections are all connected together by means of the links $p$, as described, to extend from the receiving-point to the point of delivery. In the event that the merchandise-packages are barrels or the like, all the carrier-rollers 47 may be lowered by the wedge devices described to the position shown in Fig. 14, whereby the conveyer-rollers will cause the conveyer-belt to present a concave conveyer-face along the upper stretch between the end pulleys. If flat-sided boxes or the like are to be conveyed the rollers 47 may be raised to the position shown in Fig. 13 to cause the belt to present a straight conveyer-surface. The guide-rails 63 may be adjusted as described, to permit packages of the size then being conveyed to pass readily between them and be guided to rest at their centers approximately centrally of the belt. In the event that coal or the like loose material is to be conveyed the discharge ends of the sections may be raised above the ends of the adjacent sections, as indicated by dotted lines in Fig. 5, and extend in the desired planes, whereby the material will pass from one to the other without falling between the section ends.

The construction employing, as it does, the channel-beams $a$ and cross-braces or built-up I-beams $b$ produces a particularly strong conveyer-section, the conveyer-belt of which at its upper or conveying stretch may be within a few inches of the floor. This is a particularly desirable feature, because for one reason it permits heavy packages to be readily placed thereon. The lower flanges $b'$ of the I-beam-shaped cross-braces $b$ are somewhat longer than the web portions of the beams, and at opposite end portions they are cut away from the web portions and bent downward to fit against the lower flanges of the beams $a$, as shown in Figs. 13 and 14. The link-joints $p$ permit sections to extend along different elevations and also at different angles with relation to each other, so that merchandise may be raised or lowered from one place to another.

One motor 73 may be caused to run the conveyer-belts of any desired number of sections, the belts of other sections than those provided with motors being run from the carrier-belts of the motor-sections. Where a large number of sections are connected together, it may be desirable to employ several motors 73, depending upon the work that has to be done by them in moving the belts loaded with the merchandise to be conveyed. The pivotal joints between the arms 79 of the motors and the yokes 80 and the universal joint 85 between the motor and carrier-section shafts permit the motor and carrier-sections to be at different elevations and angles with relation to each other, as may be rendered necessary by the surroundings.

My improved conveyer is particularly well adapted for use in large warehouses and upon wharves where boats receive and discharge cargoes. The sections may be readily moved from place to place and caused to extend in any way made necessary by the particular requirements. The electric motors to the number desired may readily be placed in position and connected with wires to a stationary generator, thus doing away with any necessity for line-shafts and other cumbersome means for operating the conveyers.

While I prefer to provide my improvements throughout as shown and described, they may be variously modified in the matter of details of construction without departing from the spirit of my invention as defined by the claims.

What I claim as new, and desire to secure by Letters Patent, is—

1. In a conveyer, a conveyer-section, belt-pulleys on said section, a drive-shaft for one said pulley, and operating means therefor comprising a separately-portable electric motor having a shaft and means for readily connecting together and disconnecting said shafts, substantially as and for the purpose set forth.

2. In a conveyer, a conveyer-section, belt-pulleys on said section, a drive-shaft for one said pulley, and operating means therefor comprising a separately-portable electric motor, and a readily-detachable universal-joint connection between said motor and shaft, substantially as and for the purpose set forth.

3. In a conveyer, a conveyer-section, belt-pulleys on said section, a drive-shaft for one said pulley, and operating means therefor, comprising a separately-portable electric motor having a frame and a shaft, readily-separable pivotal connecting means between said conveyer-section and motor-frame and a readily-detachable universal-joint connection between said motor-shaft and said driving-shaft, substantially as and for the purpose set forth.

4. In a conveyer, the combination of conveyer-sections placed end to end, conveyer-belts upon the sections, means for driving said belts, and a connection between the sections comprising a rock-shaft journaled in the end of one section, links secured at one end to said shaft, means for locking the shaft in different positions against rocking, and a shaft on the other said section with which the links are pivotally connected.

5. In a conveyer, the combination of conveyer-sections placed end to end, link connections between the adjacent section ends, pulleys at opposite ends of the sections, the pulleys at adjacent section ends being operatively geared together, a drive-shaft for one said pulley, and operating means therefor comprising a portable electric motor having a shaft removably connected with the said drive-shaft.

6. In a conveyer, the combination of conveyer-sections placed end to end, link connections between the adjacent section ends, pulleys at opposite ends of the sections, the pulleys at adjacent section ends being operatively geared together, a drive-shaft for one said pulley and operating means therefor, comprising a portable electric motor having a shaft, and a universal-joint connection between the said motor-shaft and drive-shaft.

7. In a conveyer, the combination of conveyer-sections placed end to end, link connections between the adjacent section ends, a drive-shaft for one said pulley, a portable electric motor having a shaft removably connected by a universal joint with the said drive-shaft, arms upon the motor, a yoke with which the said arms are pivotally connected, and a bearing upon the conveyer-section with which the yoke is pivotally secured.

8. In a conveyer, the combination with a conveyer-section, a pair of companion belt-tightening plates, guides in one end portion of said section in which said plates are mounted to slide longitudinally, means on the section for sliding said plates in their guides, a conveyer-belt pulley journaled in said plates, a conveyer-belt pulley journaled in the opposite end portion of said section, a conveyer-belt stretched around said pulleys, a second conveyer-section having belt-pulleys for a conveyer-belt journaled in its opposite ends, and a link connection between said companion belt-tightening plates and one end portion of said second conveyer-section, substantially as and for the purpose set forth.

9. In a conveyer-section, the combination with the frame thereof, of conveyer-rollers pivotally mounted at their outer ends in the said frame, adjustable bearings for the inner ends of said rollers at the center of said frame, and means for raising and lowering the said adjustable bearings, comprising a longitudinally-sliding bar having wedges, upon which said bearings rest, and sliding means for said bar, substantially as and for the purpose set forth.

10. In a conveyer-section, the combination with the frame thereof, formed with parallel sides, of stationary guide-blocks between the said sides, raising and lowering supports on the said guide-blocks, rollers pivotally connected at their inner ends to the said supports and at their outer ends to the said sides, and means for raising and lowering the said supports.

11. In a conveyer-section, a frame comprising longitudinally-extending parallel side bars and cross-braces, guide-blocks secured to the said cross-braces, raising and lowering blocks on the guide-blocks, rollers journaled at their outer ends in the said sides and at their inner ends on the said raising and lowering blocks, substantially as described.

12. In a conveyer-section, the combination with end pulleys and a conveyer-belt stretched thereon, of a series of intermediate rollers mounted at their outer ends in stationary bearings and at their inner ends in raising and lowering bearings, and means upon the section for adjusting all the said raising and lowering bearings simultaneously, comprising a longitudinally-sliding frame formed with parallel bars carrying wedges upon which said raising and lowering bearings rest, and means for sliding said frame.

13. In a conveyer-section, a frame having longitudinally-extending parallel sides, crank-arms journaled upon the said sides, and guide-rails upon the said crank-arms, substantially as described.

14. In a conveyer-section, a frame having parallel, longitudinally-extending sides, adjustable crank-arms journaled upon the said sides, guide-rails connected with the free ends of the said crank-arms, and means for locking the crank-arms in adjusted position.

CHARLES H. ANDERSON.

In presence of—
WALTER N. WINBERG,
F. M. WIRTZ.